United States Patent
Aoki et al.

[11] 3,857,954
[45] Dec. 31, 1974

[54] ACARICIDES

[75] Inventors: Yukio Aoki, Ageo; Susumu Yoshida, Tokyo; Shoichi Kato; Satoshi Inada, both of Ageo; Shuichi Ishida, Oomiya, all of Japan

[73] Assignee: Nippon Kayaku Kabushiki Kaisha, Tokyo, Japan

[22] Filed: Feb. 13, 1973

[21] Appl. No.: 332,181

[30] Foreign Application Priority Data
Feb. 14, 1972 Japan................................ 47-14865

[52] U.S. Cl.................................. 424/337, 424/340
[51] Int. Cl........ A01n 9/00, A01n 9/12, A01n 9/14
[58] Field of Search............................. 424/337, 340

[56] References Cited
UNITED STATES PATENTS
3,506,720   4/1970   Model et al......................... 424/311
3,647,888   3/1972   Rohr et al............................ 424/340

OTHER PUBLICATIONS
Chem. Abst. 75, 34342(b), (1971), Noda et al.
Chem. Abst. 75, 109015(h), (1971), Henrion, B.
Chem. Abst. 52, 11348(d), (1958).

*Primary Examiner*—Albert T. Meyers
*Assistant Examiner*—Douglas W. Robinson
*Attorney, Agent, or Firm*—Russell & Nields

[57] ABSTRACT

This invention relates to acaricides containing one or more derivatives, wherein the derivatives are expressed by the formula

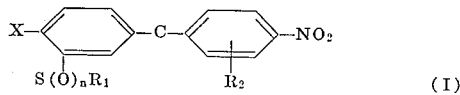

(I)

where X represents a halogen, a lower alkyl group or a lower alkoxy group, $R_1$ represents a lower saturated alkyl group or an unsaturated alkyl group $R_2$ represents hydrogen, a halogen, a lower alkyl group, a lower alkoxy group, a lower alkyl thio group, a nitro group or a trifluoromethyl group, and $n$ is any one of the integers 0, 1 and 2.

1 Claim, No Drawings

ACARICIDES

BACKGROUND OF THE INVENTION

In is well known in the art that the two-spotted spider mite (*Tetranychus urticae*) inflicts great and heavy damage on agriculturally important fruits such as apples, pears, peaches, etc., vegetables such as egg-plant, cucumbers, etc., various kinds of beans, hops, mulberry, carnation, etc., and the citrus red mite (*Panonychus citri*) also gives serious damage to citrus fruits, pears, apples, peaches, mulberries, etc., which are important from the viewpoint of fruit-culture. In order to remove or prevent the mite infliction on the crops or fuits, a variety of acaricides have heretofore been used. However, the fact is that the mites disadvantageously tend to have resistance to most of the known acaricides, thus inviting reduction in the acaricidal effect thereof. Therefore, it is strongly desired to develop a novel acaricide for overcoming this disadvantage.

SUMMARY OF THE INVENTION

We have conducted an extensive study seeking a novel acaricide and discovered that 4-nitrodiphenyl ether derivatives expressed by the above-mentioned formula (I) have particular and excellent effects in the prevention of leaf mites. These derivatives have low toxicity to warm-blooded animals and are characterized by an appropriate $LD_{50}$ value above 300 mg/Kg with an acute degree of toxicity when fed through the mouth, and also characterized by light damage to the plants or vegetables mentioned above.

Compounds of formula (I) can be obtained by condensing in the presence of an alkaline compound or an acid-binding agent a compound expressed by the following formula (II)

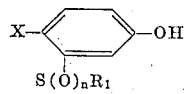

$$S(O)_nR_1 \quad (II)$$

where X, $R_1$ and $n$ have the same meaning as defined hereinbefore, and a compound expressed by the following formula (III)

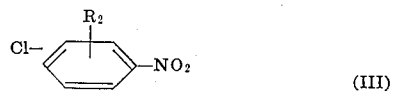

(III)

where $R_2$ has the same meaning as defined hereinbefore.

Compounds of formula (II) are, for example, as follows:
 3-n-propylthio-4-chlorophenol, 3-n-propylthio-4-bromophenol,
 3-n-propylthio-4-methylphenol, 3-ethylthio-4-chlorophenol,
 3-amylthio-4-chlorophenol, 3-allylthio-4-methylphenol,
 3-n-propylthio-4-nitrophenol, 3-n-propylsulfinyl-4-chlorophenol,
 3-n-propylsulfinyl-4-methylphenol, 3-n-propylsulfinyl-4-bromophenol,
 3-ethylsulfinyl-4-chlorophenol, 3-n-propylsulfinyl-4-methoxyphenol,
 3-ethylsulfinyl-4-ethoxyphenol, 3-n-propylsulfinyl-4-butoxyphenol,
 3-n-methylsulfinyl-4-chlorophenol, 3-n-ethylsulfinyl-4-chlorophenol,
 3-n-propylsulfonyl-4-chlorophenol, 3-n-propylsulfonyl-4-bromophenol,
 3-n-propylsulfonyl-4-methylphenol, 3-n-propylsulfonyl-4-ethylphenol,
 3-n-propylsulfonyl-4-propylphenol, 3-n-propylsulfonyl-4-methoxyphenol,
 3-ethylsulfonyl-4-methoxyphenol, 3-n-propylsulfonyl-4-ethoxyphenol, etc.

The compounds expressed by the formula (II) are novel and can, for example, be prepared by the following steps:

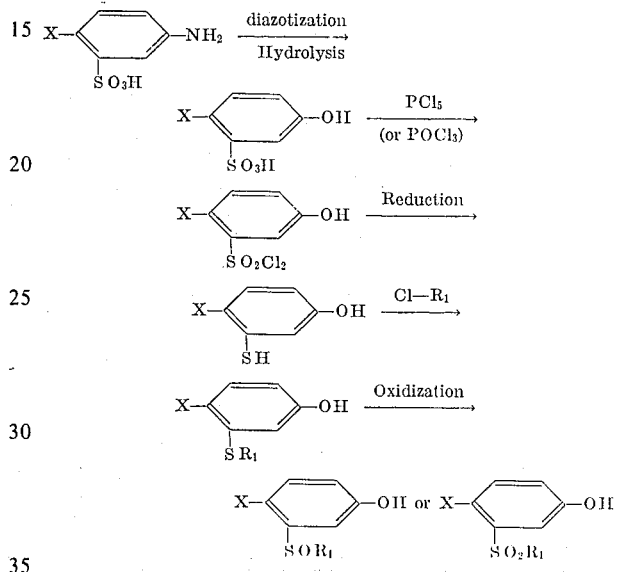

the compounds expressed by the formula (III) are known in the art and examples of them are: 3-methyl-4-chloronitrobenze, 3,4-dichloronitrobenzene, 2-methyl-4-chloronitrobenzene, 3-methoxy-4-chloronitrobenzene, 3-ethoxy-4-chloronitrobenzene, 3-methylthio-4-chloronitrobenzene, 3-propylthio-4-chloronitrobenzene, 2-trifluoromethyl-4-chloronitrobenzene, 2-methoxy-4-chloronitrobenzene, etc.

In the preparation of the compounds of formula (I), the compound of formula (II) is usually used in an amount of 1.05 to 1.2 moles per mole of the compound of formula (III). However, the compound of formula (II) can be used in a larger amount, also serving as a solvent, without use of an inactive solvent.

There can usually be used as the acid-binding agent sodium hydroxide or potassium hydroxide slightly in excess of an amount which is required in the chemical equilibrium. Furthermore, potassium carbonate may be effectively used as the acid-binding agent when a solvent which is considered to have properties of capturing cations is employed. However, if the compounds of formula (II) have been previously converted into a sodium or potassium salt thereof, it is, of course, unnecessary to use the acid-binding agent. The reaction can be smoothly conducted by using an aprotic polar solvent such as dimethyl sulfoxide, dimethylformamide, dimethyl acetoamide, or diethylglycol diethyl ether, or a protic solvent such as diethylene glycol monoethyl ether, but the use of these solvents is not essentially required. Though the amount of the solvent to be used may be optionally selected within a suitable range, extremely good results are obtained when the solvent is used in an amount less than one-tenth of the compound of formula (II).

The reaction temperature may be varied depending on the kinds of compounds and solvent used, but is within a range of 100° to 200°C, preferably 120° to 180°C. In this range, the reaction proceeds smoothly, and 90% of the starting compounds are converted into the required reaction products after about 4 hours. However, it may be necessary to react the mixture, for example, for about 6 hours under certain reaction conditions with certain particular kinds of the compound of formula (II). After completion of the reaction (or after distillation of any solvent used, following the completion of the reaction), the reaction mixture is cooled to a temperature below 100°C, and a suitable amount of water is added thereto to separate the desired oil therefrom. Then, the separated oil is extracted by the use of an organic solvent.

Any unreacted compound of formula II in the extract is removed therefrom by washing the extract several times by means of a dilute aqueous alkali hydroxide solution. Thereafter, the solvent is removed by distillation to obtain a compound of formula (I) having a purity suitable for use.

If a compound of formula (I) with $n = 0$ is oxidized by the use of an oxidizing agent such as hydrogen peroxide, the compound obtained has $n = 1$ or $n = 2$.

Compounds of the present invention which can be obtained by the above-mentioned reaction are, for example, as follows: 3-methylthio-4-methyl-4'-nitrodiphenyl ether, 3-ethylthio-4-methyl-4'nitrodiphenyl ether, 3-propylthio-4-methyl-4'-nitrodiphenyl ether, 3-butylthio-4-methyl-4'-nitrodiphenyl ether, 3-propylthio-4-ethyl-4'-nitrodiphenyl ether, 3-propylthio-4-propyl-4'-nitrodiphenyl ether, 3-propylthio-4-chloro-4'-nitrodiphenyl ether, 3-propylthio-4-bromo-4'-nitrodiphenyl ether, 3-propylthio-4-methoxy-4'-nitrodiphenyl ether, 3-ethylthio-4-methoxy-4'-nitrodiphenyl ether, 3-ethylsulfinyl-4-methyl-4'-nitrodiphenyl ether, 3-propylsulfinyl-4-methyl-4'-nitrodiphenyl ether, 3-propylsulfinyl-4-propyl-4'-nitrodiphenyl ether, 3-propylsulfinyl-4-chloro-4'-nitrodiphenyl ether, 3-propylsulfinyl-4-bromo-4'-nitrodiphenyl ether, 3-amylsulfinyl-4-chloro-4'-nitrodiphenyl ether, 3-propylsulfinyl-4-methoxyl-4'nitrodiphenyl ether, 3-ethylsulfinyl-4-methoxy-4'-nitrodiphenyl ether, 3-propylsulfinyl-4-butoxy-4'-nitrodiphenyl ether, 3-propylsulfinyl-4-methyl-4'-nitrodiphenyl ether, 3 -propylsulfinyl-4-propyl-4'-nitrodiphenyl ether, 3-ethylsulfinyl-4-chloro-4' -nitrodiphenyl ether, 3-propylsulfinyl-4-bromo-4'-nitrodiphenyl ether, 3-propylsulfinyl-4-methoxy-4'-nitrodiphenyl ether, 3-propylsulfinyl-4-propoxy-4'-nitrodiphenyl ether, 3-propylsulfinyl-4-bromo-4'-nitrodiphenyl ether, 2',4-dimethyl-3-propylthio-4'-nitrodiphenyl ether, 2'-chloro-4-methyl-3-propylthio-4'-nitrodiphenyl ether, 2'-methyl-4-chloro-3-propylthio-4'-nitrodiphenyl ether, 2', 4-dichloro-3-propylthio-4'-nitrodiphenyl ether, 3'-methyl-4-chloro-3-propylthio-4'-nitrodiphenyl ether, 2'-methoxy-4-chloro-3-propylthio-4'-nitrodiphenyl ether, 2'-methoxy-4-methyl-3-propylthio-4'-nitrodiphenyl ether, 3'-trifluoromethyl-4-methyl-3-propylthio-4'-nitrodiphenyl ether, 3,3'-dipropylthio-4-methyl-4'-nitrodiphenyl ether, 3'-nitro-4-methyl-3-propylsulfinyl-4'-nitrodiphenyl ether, etc.

The method of synthesizing the compound of formula (I) will be illustrated in more details by the following synthesizing examples.

SYNTHESIZING EXAMPLE 1-1

6.0 g (0.033 moles) of 3-n-propylthio-4-methylphenol, 2.2 g (0.033 moles) of potassium hydroxide and 30 ml of dimethyl acetoamide were introduced into a flask and the mixture was heated to a temperature above 90°C to obtain a complete solution thereof. Then, the resultant solution was cooled below 90°C and 5.2 g (0.033 moles) of 4-chloronitrobenzene was added thereto, heating the mixture for reaction at 130°–140°C for 3 hours. After completion of the reaction, the reaction mixture was cooled and was introduced into 200 ml of water. A brown oily material was separated from the aqueous reaction mixture and extracted with benzene. The extract was successively washed with a 5% hydrochloric acid solution, a 5% sodium hydroxide solution and water. After the thus washed extract was dried over sodium sulfite, the benzene was removed by distillation to obtain 9.1 g (90.9% of the theoretical) of 3-n-propylthio-4-methyl-4'nitrodiphenyl ether (Compound No. 1). This compound was recrystallized by using ethanol, with the following particulars.

Melting point of 79.0°–79.5°C (pale yellow needle-like crystal).
Elementary Analysis:
Measured Value: C: 63.45%, H: 5.69%, and N: 4.60%
Calculated Value: C: 63.34%, H: 5.65%, and N: 4.62% as $C_{16}H_{17}NO_3S$

SYNTHESIZING EXAMPLE 1-2

Example 1-1 was repeated except that 3-n-propylthio-4-chlorophenol (B.P. = 140°–142°C/2 mmHg, $n_D^{25}$ = 1.5925), potassium carbonate and 4-chloro-3-methylnitrobenzene were used instead of 3-n-propylthio-4-methylphenol, potassium hydroxide and 4-chloronitrobenzene, respectively, and the reaction was conducted at a temperature of 140°C to 150°C for 2.5 hours. As a result, 2'-methyl-4-chloro-3-n-propylthio-4'-nitrodiphenyl ether (Compound No. 2) was obtained, with particulars as follows.

Melting Point: 77.0°–77.5°C (pale yellow crystal)
Elementary Analysis:
Measured Value: C: 57.6%, H: 4.65% and N: 4.28%
Calculated Value: C: 56.89%, H: 4.77% and N: 4.15% as $C_{16}H_{16}ClNO_3S$

SYNTHESIZING EXAMPLE 1-3

Example 1-1 was repeated except that 3-n-propylthio-4-chlorophenol (B.P. = 140°–142°C/2 mm Hg, $n_D^{25}$ = 1.5925) was used instead of 3-n-propylthio-4-methylphenol thereby to give 4-chloro-3-n-propylthio-4'-nitrodiphenyl ether Compound No. 3). The resultant ether could be recrystallized from ethanol, with the following particulars.

Melting Point: 90°–91°C (pale yellow needle-like crystal)
Elementary Analysis:
Measured Value: C: 55.71%, H: 4.26% and N: 4.47%
Calculated Value: C: 55.55%, H: 4.34% and N: 4.31% as $C_{15}H_{14}ClNO_3S$

SYNTHESIZING EXAMPLE 1-4

Example 1-1 was repeated except that 3-ethylthio-4- chlorophenol (B.P. = 120°–122°C/3 mmHg) was used instead of 3-n-propylthio-4-methylphenol and the reaction was conducted at a temperature of 110°–115°C for 6 hours thereby to give 4-chloro-3-ethylthio-4'-nitrodiphenyl-ether (Compound No. 4). The thus obtained ether could be recrystallized from ethanol, with the following particulars.

Melting Point: 95.5°–95.7°C (Pale yellow crystal)
Elementary Analysis:
Measured Value: C: 54.19, H: 4.02 and N: 4.71
Calculated Value: C: 54.28, H: 3.99% and N: 4.52% as $C_{14}H_{12}ClNO_3S$

SYNTHESIZING EXAMPLE 1-5

Example 1-1 was repeated except that 3-n-amylthio-4-chlorophenol (B.P. = 153°–155°C/3 mmHg) was used instead of 3-n-propylthio-4-methylphenol, and the reaction was conducted at a temperature of 120°–130°C for 5 hours thereby to obtain 3-n-amylthio-4-chloro-4'-nitrodiphenyl ether (Compound No. 5). The resultant ether could be recrystallized from ethanol, with the following particulars.

Melting Point: 68°–69°C (Pale yellow crystal)
Elementary Analysis:
Measured Value: C: 57.89%, H: 5.20% and N: 4.01%
Calculated Value: C: 58.03%, H: 5.16% and N: 3.98% as $C_{17}H_{18}ClNO_3S$

SYNTHESIZING EXAMPLE 1-6

Example 1-1 was repeated except that 3-n-propylthio-4-bromophenol (B.P. = 116°–118°C, $n_D^{25}$ = 1.6105) was used instead of 3-n-propylthio-4-methylphenol and the reaction was conducted at a temperature of 140°–150°C thereby to give 4-bromo-3-n-propylthio-4'-nitrodiphenyl ether (Compound No. 6). The resultant ether could be recrystallized from ethanol, with the following particulars.

Melting Point: 88°–89°C (Yellow scaly crystal)
Elementary Analysis:
Measured Value: C 48.77%, H: 3.54% and N: 3.92%
Calculated Value: C: 48.93%, H: 3.83% and N: 3.80% as $C_{15}H_{14}BrNO_3S$

SYNTHESIZING EXAMPLE 1-7

Example 1-1 was repeated except that 3-n-propylthio-4-methoxy-4'-nitrophenol was used instead of 3-n-propylthio-4-methylphenol, and the reaction was conducted at a temperature of 100°–110°C for 7 hours thereby to give 4-methoxy-3-n-propylthio-4'-nitrodiphenyl ether (Compound No. 7). The thus obtained ether could be recrystallized from ethanol, with following particulars.

Melting Point: 119°–120°C (Pale Yellow crystal)
Elementary Analysis:
Measured Value: C: 60.18%, H: 5.34% and N: 4.56%
Calculated Value: C: 60.17%, H: 5.37% and N: 4.39% as $C_{16}H_{17}NO_4S$

SYNTHESIZING EXAMPLE 2-1

4 g (0.0187 moles) of 3-n-propylsulfinyl-4-methoxyphenol (M.P. = 108°–109°C), 1.1g (0.0196 moles) of potassium hydroxide and 40 ml of dimethylformamide were introduced into a flask and were heated for dissolution. Then, 2.1 g (0.0165 moles) of 4-chloronitrobenzene were added to the mixture below 90°C, and the resultant mixture was heated to a temperature of 130°–140°C and was reacted at this temperature for 6 hours. After completion of the reaction, the reaction product was treated in the same manner as in Example 1-1 to obtain 4.4g (79.6% of the theoretical) of 4-methoxy-3-n-propylsulfinyl-4'-nitrodiphenyl ether (Compound No. 8). The thus obtained ether could be recrystallized from ethanol, with the following particulars.

Melting Point: 111°–112°C (Pale yellow scaly crystal)
Elementary Analysis:
Measured Value: C: 57.12%, H: 4.96% and N: 4.08%
Calculated Value: C: 57.30%, H: 5.11 and N: 4.18% as $C_{16}H_{17}NO_5S$

SYNTHESIZING EXAMPLE 2-2

Example 2-1 was repeated except that 3n-propylsulfinyl-4-bromophenol (M.P. = 121°–122°C), potassium carbonate and ethylene glycol monoethyl ether were used instead of 3-n-propylsulfinyl-4-methoxyphenol, potassium hydroxide and dimethylacetoamide, respectively, to give 4-bromo-3-n-propylsulfinyl-4'-nitrodiphenyl ether (Compound No. 9). The resultant ether could be recrystallized from ethanol, with the following particulars.

Melting Point: 77.5°–78.5°C (Pale yellow crystal)
Elementary Analysis:
Measured Value: C: 46.62%, H: 3.42% and N: 3.45%
Calculated Value: C: 46.89%, H: 3.67% and N: 3.65% as $C_{15}H_{14}BrNO_4S$

SYNTHESIZING EXAMPLE 2-3

Example 2-1 was repeated except that 3-n-propylsulfinyl-4-chlorophenol (M.P. = 80°–81°C) and 4-chloro-3-methylnitrobenzene were used to obtain 4-chloro-3-n-propylsulfinyl-2'-methyl-4'-nitrodiphenyl ether (Compound No. 10). The resultant ether could be recrystallized from ethanol, with particulars as follows.

Melting Point: 106°–107°C (Pale yellow needle-like crystal)
Elementary Analysis:
Measured Value: C: 54.57%, H: 4.56% and N: 4.06%
Calculated Value: C: 54.31%, H: 4.56% and N: 3.96% as $C_{16}H_{16}ClNO_4S$

SYNTHESIZING EXAMPLE 2-4

Example 2-1 was repeated except that 3-n-propylsulfinyl-4-methylphenol (M.P. = 84°–85°C) and 2,4-dinitrochlorobenzene were used, and potassium carbonate and dimethylformamide were used instead of potassium hydroxide and dimethylacetoamide, respectively, to obtain 2',4'-dinitro-3-n-propylsulfinyl-4-methyldiphenyl ether (Compound No. 11). The thus obtained ether could be recrystallized from ethanol, with the following particulars.

Melting Point: 91.5°–92.5°C (Pale yellow crystal)
Elementary Analysis:
Measured Value: C: 52.60%, H: 4.22% and N: 7.51%
Calculated Value: C: 52.74%, H: 4.43% and N: 7.69% as $C_{16}H_{16}N_2O_6S$

SYNTHESIZING EXAMPLE 3

5 g (0.0233 moles) of 4-methyl-3-n-propylsulfonylphenol (M.P. = 92°–3°C), 1g (0.025 moles) of sodium hydroxide and 30 ml of dimethylformamide were introduced into a flask and mixed together. The mixture was heated to 80°–100°C for completely dissolving the same. To the mixture added were 4.0 g (0.0228 moles) of 4-chloro-2-methoxynitrobenzene. The resultant mixture was heated for reaction at a temperature of 140' to 150°C for 5 hours. After completion of the reaction, the treatment of Synthesizing Example 1-1 was repeated to obtain 6.5 g (78.1% of the theoretical) 4-methyl-3'-methoxy-3-n-propylsulfinyl-4'-nitrodiphenyl ether. The thus obtained ether could be recrystallized from ethanol, with the following particulars.

Melting Point: 93°–94°C (yellow crystal)
Elementary Analysis:
Measured Value: C: 55.78%, H: 5.09% and N: 3.88%
Calculated Value: C: 55.88%, H: 5.24% and N: 3,83% as $C_{17}H_{19}NO_6S$

SYNTHESIZING EXAMPLE 4

3.5 g (0.0163 moles) of 4-chloro-3-n-propylsulfonylphenol (M.P. = 62°–4°C), and 0.9 g (0.0178 moles) of potassium hydroxide were dissolved in 50 ml of methanol, and then the methanol was completely removed from the solution by distillation to obtain a potassium salt of 4-methyl-3-n-propylsulfonylphenol. To the salt added were 10 g (0.0444 moles) of 5-chloro-2-nitrotrifluoromethylbenzene, and the resultant mixture was first heated to a temperature of 130°–140°C for 2.5 hours and then to a temperature of 170°–180°C for 2 hours. After completion of the reaction, the reaction mixture was cooled to a suitable temperature and water was added thereto. Thereafter, water vapor was passed to distill excessive 5-chloro-2-nitrotrifluoromethylbenzene. After completion of the distillation, the reaction mixture was cooled and the residue was extracted with benzene. Then, the treatment of Synthesizing Example 1-1 was repeated to obtain 4.9 g (71.0% of the theoretical) of 4-chloro-3-n-propylsulfonyl-3'-trifluoromethyl-4'-nitrodiphenyl ether (Compound No. 13).

The thus obtained ether could be recrystallized from ethanol and was in the form of pale yellow crystal having a melting point of 132°–3°C.

Elementary Analysis:
Measured Value: C: 42.25%, H: 3.06% and N: 3.28%
Calculated Value: C: 45.35%, H: 3.09% and N: 3.31% as $C_{16}H_{13}ClF_3NO_5S$

SYNTHESIZING EXAMPLE 5

13 g (0.072 moles) of 3-allylthio-4-methylphenol (B.P. = 122°–124°C/2 mmHg $n_D^{25}$ = 1.5953), 10 g (0.072 moles) of potassium carbonate and 50 ml (0.0685 moles) of dimethylformamide were mixed together, to which added were 10.8 g of 4-chloronitrobenzene. The resultant mixture was reacted at a temperature of 110°–130°C for 6 hours to obtain 20 g (97.7% of the theoretical) of 3-allylthio-4-methyl-4'-nitrodiphenyl ether (Compound No. 14). The thus obtained ether could be recrystallized from ethanol, with the following particulars.

Melting Point: 81°–82°C (Pale yellow needle-like crystal)
Elementary Analysis:
Measured Value: C: 63.49%, H: 4.89% and N: 4.53%
Calculated Value: C: 63.77%, H: 5.02% and N: 4.65% as $C_{16}H_{15}NO_3S$

SYNTHESIZING EXAMPLES 6-46

Synthesizing Example 1-1 was repeated except for starting materials to obtain various kinds of final compounds corresponding to the starting materials, the final compounds being expressed by the following formula

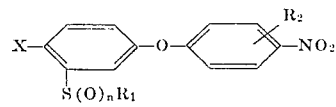

The resultant compounds were summarized in Table 1 below together with "Appearance", "Melting Point" and "Elementary Analysis", wherein the bracketed material in "Appearance" shows a solvent which was used for purification, but unless otherwise specified, ethanol was used for recrystallization.

| Compound No. | X | $R_1$ | $R_2$ and position | n | Appearance | Melting Point (°C) or $nD^{25}$ | Elementary Analysis C% | (Measurement Calculation) H% | N% |
|---|---|---|---|---|---|---|---|---|---|
| 15 | $CH_3$ | $n\text{-}C_3H_7$ | 2-$CH_3$ | 0 | Pale yellow crystal (petroleum-ether) | 54.5–55.5 | 64.44 | 6.19 | 4.61 |
| | | | | | | | 56.65 | 4.70 | 4.25 |
| 16 | $CH_3$ | $n\text{-}C_3H_7$ | 2-Cl | 0 | Pale yellow crystal (petroleum-ether) | 34.5–35.5 | 56.65 | 4.70 | 4.25 |
| | | | | | | | 56.89 | 4.77 | 4.15 |
| 17 | Cl | $n\text{-}C_3H_7$ | 2-Cl | 0 | Pale yellow crystal (petroleum-ether) | 68–69 | 50.24 | 3.48 | 3.99 |
| | | | | | | | 50.29 | 3.66 | 3.91 |
| 18 | Cl | $n\text{-}C_3H_7$ | 3-$CH_3$ | 0 | Pale yellow crystal | 63.0–63.5 | 57.09 | 4.62 | 4.22 |
| | | | | | | | 56.89 | 4.77 | 4.15 |
| 19 | Cl | $n\text{-}C_3H_7$ | 2-$CH_3O$ | 0 | Pale yellow needle-like crystal | 79.0–80.0 | 54.48 | 4.60 | 3.97 |
| | | | | | | | 54.31 | 4.56 | 3.96 |
| 20 | Cl | $n\text{-}C_3H_7$ | 3-$CF_3$ | 0 | Pale yellow crystal | 66.0–66.5 | 49.00 | 3.07 | 3.71 |
| | | | | | | | 49.05 | 3.34 | 3.58 |
| 21 | Cl | $n\text{-}C_3H_7$ | 2-$NO_2$ | 0 | Pale yellow crystal | 71 | 48.81 | 3.31 | 7.55 |
| | | | | | | | 48.85 | 3.55 | 7.60 |
| 22 | $CH_3$ | $n\text{-}C_3H_7$ | 2-$NO_2$ | 0 | Pale yellow crystal | 44.5–45.5 | 55.45 | 4.42 | 7.97 |
| | | | | | | | 55.16 | 4.63 | 8.04 |
| 23 | $CH_3$ | $n\text{-}C_3H_7$ | 3-$CH_3O$ | 0 | Yellow Crystal | 60.0–60.5 | 61.26 | 5.59 | 4.17 |
| | | | | | | | 61.24 | 5.74 | 4.20 |
| 24 | Cl | $n\text{-}C_3H_7$ | 3-$CH_3O$ | 0 | Pale yellow crystal | 65.0–66.0 | 54.28 | 4.56 | 3.86 |
| | | | | | | | 54.31 | 4.56 | 3.96 |

| Compound No. | X | R₁ | R₂ and position | n | Appearance | Melting Point (°C) or $n_D^{25}$ | Elementary Analysis C% | (Measurement Calculation) H% | N% |
|---|---|---|---|---|---|---|---|---|---|
| 25 | CH₃ | n-C₃H₇ | H | 0 | Pale yellow crystal | 43.0–44.0 | 64.44 64.33 | 5.81 6.03 | 4.40 4.41 |
| 26 | CH₃ | n-C₃H₇ | 2-CH₃O | 0 | Pale yellow crystal | 50.0–51.0 | 61.43 61.24 | 5.69 5.74 | 4.25 4.20 |
| 27 | CH₃ | n-C₃H₇ | 3-CF₃ | 0 | Yellow Oil | 1.5668 | 54.92 54.98 | 4.23 4.34 | 3.76 3.77 |
| 28 | CH₃ | n-C₃H₇ | 3-n-C₃H₇S | 0 | Yellow crystal | 50–51 | 60.64 60.45 | 6.16 6.14 | 3.82 3.71 |
| 29 | CH₃ | n-C₃H₇ | H | 0 | Pale yellow crystal | 79.0–79.5 | 63.45 63.34 | 5.69 5.65 | 4.60 4.62 |
| 30 | CH₃ | n-C₃H₇ | 3-CH₃ | 1 | Pale yellow oil | 1.6053 | 61.13 61.24 | 6.00 5.74 | 4.43 4.20 |
| 31 | CH₃ | n-C₃H₇ | 2-CH₃O | 1 | Yellow oil | 1.6072 | 58.74 58.44 | 5.43 5.48 | 3.76 4.01 |
| 32 | CH₃ | n-C₃H₇ | 3-CF₃ | 1 | Yellow oil | 1.5602 | 52.76 52.71 | 4.28 4.16 | 3.52 3.62 |
| 33 | CH₃ | n-C₃H₇ | 2-CH₃ | 1 | Pale yellow crystal | 85–86 | 61.24 61.24 | 5.73 5.74 | 4.23 4.20 |
| 34 | CH₃ | n-C₃H₇ | 2-CH₃ | 2 | Pale yellow crystal | 49–49.5 | 58.31 58.44 | 5.46 5.48 | 3.98 4.01 |
| 35 | CH₃ | n-C₃H₇ | 2-Cl | 1 | Pale yellow crystal | 65–5.5 | 54.43 54.31 | 4.48 4.56 | 3.99 3.96 |
| 36 | CH₃ | n-C₃H₇ | 2-Cl | 2 | Pale yellow crystal | 71–72 | 51.92 51.96 | 4.28 4.36 | 3.56 3.79 |
| 37 | CH₃ | n-C₃H₇ | 2-NO₂ | 2 | Pale yellow crystal | 104–104.5 | 50.71 50.52 | 4.06 4.24 | 7.23 7.36 |
| 38 | CH₃ | n-C₃H₇ | 3-CH₃O | 1 | Pale orange oil | 1.6085 | 58.72 59.44 | 5.53 5.48 | 3.85 4.01 |
| 39 | Cl | n-C₃H₇ | 2-CH₃ | 2 | Pale yellow crystal | 102–103 | 51.88 51.96 | 4.20 4.36 | 3.49 3.79 |
| 40 | Cl | n-C₃H₇ | 2-Cl | 1 | Crystal | 62–63 | 48.09 48.14 | 3.40 3.50 | 3.70 3.74 |
| 41 | Cl | n-C₃H₇ | 2-Cl | 2 | Pale yellow crystal | 103–104 | 46.16 46.17 | 3.29 3.36 | 3.39 3.59 |
| 42 | Cl | n-C₃H7 | 3-CH₃ | 1 | Pale yellow oil | 1.6142 | 54.14 54.31 | 4.41 4.56 | 3.69 3.96 |
| 43 | Cl | n-C₃H₇ | 3-CH₃ | 2 | Pale yellow crystal | 113–114 | 51.96 51.96 | 4.32 4.36 | 3.61 3.79 |
| 44 | Cl | n-C₃H₇ | 2-CH₃O | 1 | Pale yellow crystal | 124.5–125.0 | 51.99 51.96 | 4.29 4.36 | 3.72 3.79 |
| 45 | Cl | n-C₃H₇ | 2-CH₃O | 2 | Pale yellow crystal | 120.5–121.5 | 50.00 49.81 | 4.10 4.18 | 3.37 3.63 |
| 46 | Cl | n-C₃H₇ | 3-CF₃ | 1 | Pale Yellow crystal | 72.0–73.5 | 47.30 47.13 | 3.08 3.21 | 3.44 3.44 |
| 47 | Cl | n-C₃H₇ | 3-CF₃ | 2 | Pale yellow crystal | 132–132 | 45.25 45.35 | 3.06 3.09 | 3.28 3.31 |
| 48 | Cl | n-C₃H₇ | 2-NO₂ | 1 | Yellow crystal | 88–89 | 46.78 46.82 | 3.23 3.40 | 7.08 7.28 |
| 49 | Cl | n-C₃H₇ | 2-NO₂ | 2 | pale yellow crystal | 124–125 | 45.24 44.95 | 3.12 3.27 | 6.84 6.99 |
| 50 | Cl | n-C₃H₇ | 3-OCH₃ | 1 | Pale yellow oil | 1.6170 | 52.20 51.95 | 4.36 4.36 | 3.77 3.79 |
| 51 | Cl | n-C₃H₇ | 3-OCH₃ | 2 | Pale yellow crystal | 74.5–75.5 | 49.95 49.81 | 4.09 4.18 | 3.45 3.13 |
| 52 | CH₃O | n-C₃H₇ | H | 2 | Colorlessness needle like crystal | 100–100.5 | 54.53 54.69 | 4.79 4.88 | 4.16 3.99 |
| 53 | CH₃ | n-C₃H₇ | H | 1 | Pale yellow needle like crystal | 49.5–50.5 | 60.21 60.17 | 5.22 5.31 | 4.49 4.39 |
| 54 | CH₃ | n-C₃H₇ | H | 2 | Pale yellow crystal | 60–61 | 57.46 57.30 | 4.99 5.11 | 4.01 4.18 |
| 55 | Cl | n-C₃H₇ | H | 1 | Colorlessness crystal | 86–86.5 | 52.75 52.86 | 4.09 4.14 | 3.98 4.11 |

| Compound No. | X | $R_1$ | $R_2$ and position | n | Appearance | Melting Point (°C) or $nD^{25}$ | Elementary Analysis C% | H% | N% | (Measurement Calculation) |
|---|---|---|---|---|---|---|---|---|---|---|
| 56 | Cl | n-$C_3H_7$ | H | 2 | Colorlessness crystal | 61 – 61.5 | 50.52 | 3.82 | 4.11 | |
| | | | | | | | 50.49 | 3.95 | 3.93 | |
| 57 | n-$C_4H_9O$ | n-$C_3H_7$ | H | 0 | Yellow crystal | 81.5 – 82.5 | 63.01 | 6.29 | 4.01 | |
| | | | | | | | 63.14 | 6.41 | 3.88 | |
| 58 | Cl | $C_2H_5$ | H | 1 | white crystal | 70.5 – 71.5 | 51.48 | 3.62 | 4.11 | |
| | | | | | | | 51.62 | 3.71 | 4.30 | |
| 59 | n-$C_4H_9O$ | n-$C_3H_7$ | H | 1 | Pale yellow crystal | 67 –68 | 60.38 | 6.05 | 3.52 | |
| | | | | | | | 60.46 | 6.14 | 3.71 | |
| 60 | Cl | n-$C_5H_{11}$ | H | 1 | White crystal | 56.5 – 57.5 | 55.37 | 4.78 | 3.60 | |
| | | | | | | | 55.51 | 4.93 | 3.81 | |
| 61 | $CH_3$ | n-$C_3H_7$ | 3-$CF_3$ | 2 | Pale yellow crystal | 85–88 | 50.66 | 3.87 | 3.27 | |
| | | | | | | | 50.61 | 4.00 | 3.47 | |
| 62 | $CH_3$ | $C_2H_5$ | 3-$CF_3$ | 0 | Pale yellow crystal | 67–68 | 53.69 | 3.80 | 3.73 | |
| | | | | | | | 53.78 | 3.95 | 3.92 | |
| 63 | $CH_3$ | $C_2H_5$ | 3-$CF_3$ | 1 | Colorlessness oil | 1.5690 | 51.27 | 3.65 | 3.70 | |
| | | | | | | | 51.47 | 3.78 | 3.75 | |
| 64 | $CH_3$ | $CH_2$=CH-$CH_2$ | 3-$CH_3O$ | 0 | Pale yellow oil | 1.6271 | 61.58 | 5.06 | 4.18 | |
| | | | | | | | 61.61 | 5.17 | 4.23 | |
| 65 | $CH_3$ | $CH_2$=CH-$CH_2$ | 3-$CH_3O$ | 1 | Pale yellow oil | 1.6175 | 58.70 | 4.85 | 3.99 | |
| | | | | | | | 58.78 | 4.93 | 4.03 | |
| 66 | Cl | n-$C_5H_{11}$ | 2-Cl | 0 | Pale yellow oil | 1.6158 | 52.67 | 4.30 | 3.41 | |
| | | | | | | | 52.86 | 4.44 | 3.63 | |
| 67 | Cl | n-$C_5H_{11}$ | 2-Cl | 1 | Pale yellow oil | 1.6053 | 50.66 | 4.18 | 3.19 | |
| | | | | | | | 50.75 | 4.26 | 3.48 | |

The thus obtained compounds may be used as an acaricide singly or in combination with a suitable additive or additives in the form of emulsion, hydrate or powder. The additives may include a carrier or a supplementary material which is usually employed in agricultural chemicals. The carrier mentioned herein is intended to mean a transferring material which is utilized for transferring active components to a certain place. The carrier may be a solid, liquid or gas. That is to say, the solid carrier may be a clay, talc, bentonite, white carbon, kaolin, diatomaceous earth or silica. The liquid carrier may be, for example, water, benzene, kerosene, alcohols, acetone, xylene, methylnaphthalene, cyclohexane, animal and plant oils, aliphatic acids or esters of aliphatic acids, and the gaseous carrier may be air, nitrogen, carbon dioxide, freon or the like.

The supplementary material includes, for example, a spreader, an emulsion, a sticking agent, a wetting or surface active agent, viz, polyoxyethylenealkylallylether, polyvinyl alcohol, polyoxyethylenesorbitanmonooleate, alkyldimethylbenzylammoniumchloride, alkylbenzenesulfonate, ligninsulfonate, an ester of higher alcohol and sulfuric acid, etc.

When used as a solution, the compound or acaricide of the present invention is usually diluted with the additive or supplementary material within a range of 0.1–0.01% by weight. The solution is preferred to be used in an amount of 100–1000 1/10 are. Furthermore, when used as a powdered or granulated form, the acaricide should preferably contain 0.5–5% by weight of the compound of the present invention and is used within a range of 2–5 kg/10 are.

The acaricide of the present invention has excellent effects on citrus red mite or *Panonychus citri*, two-spotted spider mite or *Tetranychus urticae*, European red mite or *Panonychus ulmi*, carmine mite or *Tetranchus telarius*, sweet cherry spider mite or *Tetranychus viennensis*, Kanzawa spider mite or *Tetranychus kanzawai*, and particularly on mites.

The acaricidal effects of the compounds of the present invention will be understood from the following particular Examples.

EXAMPLE 1

Two seed leaves of a kidney-bean (a kind of Shinedogawa) which was cultivated in a porous pot having a diameter of 6 cm were cut into pieces of about 3 square cm. Fifteen female imagos of two-spotted spider mites were inoculated per leaf, and the mites were allowed to deposit eggs on the leaves for a day. Then, the mites were removed from the leaves and the numbers of the eggs were counted. Then, each leaf was immersed for 10 seconds in a solution containing 0.04% by weight of the acaricidal compound of the present invention. For comparison, Akar 338 (a registered trade mark owned by Ciba-Geigy A. G. and it identifies a product in which the effective component is ethyl 4,4'-dichlorobenzilate) was selected as a reference, and an egg-deposited leaf was immersed in a solution containing Akar 338 in the same manner as mentioned above. After the treatment, each leaf was allowed to stand in a green house for 7 days and numbers of non-incubated eggs were observed by means of a binocular stereomicroscope to estimate a ratio of dead eggs to originally deposited ones.

The test results are shown in Table 2.

Table 2

Ratio of Dead Eggs to Originally Deposited Ones of Two-Spotted Spider Mite

| | Compound No. | Egg-Killing Ratio (%) |
|---|---|---|
| Present Invention | 10 | 100 |
| | 56 | 100 |
| Reference | Akar 338 | 60 |
| Non-treated | | 0 |

EXAMPLE 2

A summer orange was cultivated in a porous pot having a diameter of 12 cm. All leaves except two were cut off. A tangle was applied onto stalks of two leaves and 10 female imagos of citrus red mites were inoculated per leaf to allow them to deposit eggs for 2 days.

Then, a solution containing 0.04% by weight of each of the compounds in accordance with the present invention were scattered on each leaf for 20 seconds by means of a spray gun. After the scattering, the resultant leaves were allowed to stand for 48 hours in a green house. The death and life of the mites were observed by means of a binocular stereomicroscope to calculate an acaricidal ratio. Thereafter, the dead and living mites were removed from each of the leaves and numbers of eggs were counted, leaving the leaves in the green house for 7 days.

Numbers of non-incubated eggs were observed by means of a binocular stereomicroscope to obtain an egg-killing ratio.

The test results are shown in Table 3.

Table 3

Acaricidal and Egg-Killing Ratios for Citrus Red Mite

| Compound Nos. | Acaricidal Ratio (%) | Egg-Killing Ratio (%) |
|---|---|---|
| 1 | 100 | 98 |
| 8 | 95 | 70 |
| 9 | 100 | 100 |
| 10 | 100 | 100 |
| 29 | 100 | 98 |
| 53 | 100 | 100 |
| 55 | 100 | 100 |
| 59 | 67 | 65 |
| 60 | 61 | 70 |
| Non-treated | 2 | 0 |

The acaricidal composition of the present invention will be particularly illustrated by the following Composition Examples. The Composition Examples are not meant to limit the scope of the present invention but are offered to show some of the preferred acaricidal compositions.

EXAMPLE 3

Two seed leaves of a kidney-bean (a kind of Shinedogawa) which was cultivated in porous pot having a diameter of 6 cm. were cut into pieces of about 3 square cm. Fifteen female imagos of two spotted spider mites were inoculated per leaf. Then, each leaf was immersed for 10 seconds in a solution containing 0.04% by weight of the acaricidal compound of the present invention.

The resultant leaves were allowed to stand for 48 hours in a green house. The death and life of the mites were observed to calculate acaricidal ratio. Thereafter, living mites were removed from each of the leaves. After leaving the leaves in the green house for 7 days, number of non-incubated eggs were observed by means of a binocular stereomicroscope to obtain an egg-killing ratio.

The test results are shown in Table 4.

Table 4

Acaricidal and Egg-Killing Ratios for Two-Spotted Spider Mite

| Compound No. | Acaricidal Ratio (%) | Egg-Killing Ratio (%) |
|---|---|---|
| 15 | 87 | 100 |
| 20 | 100 | 100 |
| 23 | 92 | 100 |
| 24 | 64 | 84 |
| 27 | 100 | 100 |
| 32 | 94 | 100 |
| 33 | 75 | 80 |
| 38 | 84 | 98 |
| 46 | 82 | 86 |
| 50 | 75 | 82 |
| 61 | 74 | 60 |
| 62 | 100 | 100 |
| 63 | 96 | 100 |
| 64 | 100 | 100 |
| 65 | 93 | 96 |
| 66 | 83 | 88 |
| 67 | 79 | 90 |
| Akar 338 | 100 | 71 |
| Non-treated | 13 | 6 |

COMPOSITION EXAMPLE 1 — EMULSION

The following compounds are mixed together and the resultant mixture is diluted with water, for use by scattering.

| | |
|---|---|
| 3-propylthio-4-chloro-4'-nitrodiphenyl ether | 20 parts by weight |
| Xylene | 20 parts by weight |
| Isopropanol | 35 parts by weight |
| Polyoxyethylenealkylphenol | 25 parts by weight |

COMPOSITION EXAMPLE 2 — HYDRATE

The following compounds are mixed together and pulverized into fine powder. When used, the fine powder is dispersed in water.

| | |
|---|---|
| 3-propylsulfinyl-4-chloro-4'-nitrodiphenyl ether (or 3-propylsulfinyl-4'-nitrodiphenyl ether | 20 parts by weight 20 parts by weight) |

| Synthetic hydrated silicic acid | 10 parts by weight |
| Kaolin | 62 parts by weight |
| Sodium ligninsulfonate | 5 parts by weight |
| Sodium dodecylbenzenesulfonate | 3 parts by weight |

COMPOSITION EXAMPLE 3 — POWDER

The following compounds are mixed together. When using, the mixture is scattered in the form of powder.

| 3-propylsulfinyl-4-methoxy-4'-nitrodiphenyl ether | 3 parts by weight |
| Synthetic hydrated silicic acid | 1 part by weight |
| Clay | 96 parts by weight |

What is claimed is:

1. The method of controlling acarids comprising applying to acarids and their eggs an acaricidally effective amount of a compound of the formula

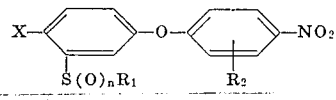

where

X is selected from the group consisting of Cl, Br, $CH_3$, $CH_3O$ and $C_4H_9O$, $R_1$ is selected from the group consisting of an alkyl having from 1 to 5 carbon atoms and allyl, $R_2$ is selected from the group consisting of, H, $CH_3$ $CF_3$, $CH_3O$ and Cl, and $n$ is an integer of 0, 1 and 2.

* * * * *